United States Patent
Takano et al.

(10) Patent No.: US 8,587,554 B2
(45) Date of Patent: *Nov. 19, 2013

(54) TOUCH SENSOR FUNCTION-EQUIPPED DISPLAY DEVICE

(75) Inventors: Yasushi Takano, Matsumoto (JP); Hiromi Saito, Chino (JP)

(73) Assignee: Seiko Epson Corporation (JP)

( * ) Notice: Subject to any disclaimer, the term of this patent is extended or adjusted under 35 U.S.C. 154(b) by 757 days.

This patent is subject to a terminal disclaimer.

(21) Appl. No.: 12/715,585

(22) Filed: Mar. 2, 2010

(65) Prior Publication Data
US 2010/0231551 A1    Sep. 16, 2010

(30) Foreign Application Priority Data
Mar. 10, 2009  (JP) ................................ 2009-057203

(51) Int. Cl.
*G06F 3/045*  (2006.01)

(52) U.S. Cl.
USPC ...... 345/174; 345/173; 178/18.06; 178/18.07

(58) Field of Classification Search
USPC ................................................ 345/173–179
See application file for complete search history.

(56) References Cited

U.S. PATENT DOCUMENTS 8,144,115 B2 * 3/2012 Konicek ........................ 345/104

FOREIGN PATENT DOCUMENTS

| JP | 08-234906 | 9/1996 |
|----|-----------|--------|
| JP | 2007-242044 | 9/2007 |
| JP | 2009-003672 | 1/2009 |

* cited by examiner

*Primary Examiner* — Kevin M Nguyen
*Assistant Examiner* — Kenneth B Lee, Jr.
(74) *Attorney, Agent, or Firm* — Harness, Dickey & Pierce, P.L.C.

(57) ABSTRACT

A touch sensor function-equipped display device includes: a first substrate that has a common electrode; a second substrate that is disposed to face the first substrate; a display unit that is disposed between the first substrate and the second substrate; and a touch sensor that detects a touch position on a touch surface disposed on the first substrate side or the second substrate side. The second substrate includes: a plurality of data lines that are aligned in a row direction; a plurality of gate lines that are aligned in a column direction approximately perpendicular to the data lines; a plurality of pixel electrodes that are disposed in each pixel area that is surrounded by a pair of adjacent data lines and a pair of adjacent gate lines; a plurality of capacitance lines that form capacitance with each of the pixel electrodes therebetween; and a plurality of thin film transistors that are disposed for each of the plurality of pixel electrodes and are electrically connected to the pixel electrodes, the data lines, and the gate lines. The touch sensor includes an electric-potential rise rate detecting unit that detects a rise rate of an electric potential of each pixel area at the time of charging by applying a charge signal to the capacitance line and detects a position of the pixel area in which the rise rate of the electric potential detected by the electric-potential rise rate detecting unit is out of a predetermined range as the touch position.

14 Claims, 6 Drawing Sheets

TOUCH SENSOR FUNCTION-EQUIPPED DISPLAY DEVICE

BACKGROUND

1. Technical Field

The present invention relates to a touch sensor function-equipped display device.

2. Related Art

For touch sensor function-equipped display devices, a configuration such as an ATM in which an input device is mounted on a liquid crystal display device is known. In addition, as input devices, touch panel devices that determine a touch position by bringing an input tool such as a touch pen, a person's finger, or the like of electronic apparatuses into contact with an arbitrary position on a touch surface and perform various operations, inputs, or the like are known. As such touch panel devices, for example, devices of various types such as a resistance film type, an electrostatic capacitance type, and an ultrasonic surface acoustic wave type are known (for example, see JP-A-2009-3672).

In JP-A-2009-3672, as a touch sensor function-equipped display device, an electro-optical device in which a touch panel device of an ultrasonic surface acoustic wave type is mounted on a liquid crystal display device is disclosed. In such an electro-optical device, an image displayed on the liquid crystal display device is visually recognized through the touch panel device. Accordingly, the touch panel device (a portion corresponding to a screen of the liquid crystal display device) is formed of a transparent member.

However, according to the electro-optical device described in JP-A-2009-3672, light is absorbed or reflected by each portion of the touch panel device when the light generated from the liquid crystal display device is transmitted through the touch panel device. Accordingly, an excellent image cannot be provided. In addition, according to the electro-optical device described in JP-A-2009-3672, since a configuration in which the touch panel device is mounted on the liquid crystal display device is used, the size of the device is increased.

SUMMARY

An advantage of some aspects of the invention is that it provides a touch sensor function-equipped display device, by adding a touch sensor function to a display device, capable of providing an excellent image and decreasing the size thereof.

According to the aspects of the invention, the following are provided.

According to an aspect of the invention, there is provided a touch sensor function-equipped display device including: a first substrate that has a common electrode; a second substrate that is disposed to face the first substrate; a display unit that is disposed between the first substrate and the second substrate; and a touch sensor that detects a touch position on a touch surface disposed on the first substrate side or the second substrate side. The second substrate includes: a plurality of data lines that are aligned in a row direction; a plurality of gate lines that are aligned in a column direction approximately perpendicular to the data lines; a plurality of pixel electrodes that are disposed in each pixel area that is surrounded by a pair of adjacent data lines and a pair of adjacent gate lines; a plurality of capacitance lines that form capacitance with each of the pixel electrodes therebetween; and a plurality of thin film transistors that are disposed for each of the plurality of pixel electrodes and are electrically connected to the pixel electrodes, the data lines, and the gate lines. The touch sensor includes an electric-potential rise rate detecting unit that detects a rise rate of the electric potential of each pixel area at the time of charging by applying a charge signal to the capacitance line and detects a position of the pixel area in which the rise rate of the electric potential detected by the electric-potential rise rate detecting unit is out of a predetermined range as the touch position.

According to the above-described device, there is provided a touch sensor function-equipped display device, by adding a touch sensor function to a display device, capable of providing an excellent image and decreasing the size thereof.

In the above-described touch sensor function-equipped display device, it is preferable that the plurality of capacitance lines are aligned in the column direction in correspondence with the plurality of scanning lines.

In such a case, a touch position on the touch surface can be detected by performing a control operation that is similar to that for displaying an image on the display surface. Accordingly, the complexity of the control operation is suppressed, and the touch position on the touch surface can be assuredly detected in a simple manner.

In the above-described touch sensor function-equipped display device, it is preferable that the electric-potential rise rate detecting unit detects the rise rate of the electric potential of each pixel area through the plurality of data lines.

In such a case, simplification of the device configuration can be achieved.

In the above-described touch sensor function-equipped display device, it is preferable that the touch sensor charges each pixel area by sequentially applying voltages to the plurality of gate lines and applying a charge signal to the capacitance line corresponding to the gate line to which the voltage is applied and detects the rise rate of the electric potential of the each pixel area at that time by using the electric-potential rise rate detecting unit.

In such a case, the rise rate of the electric potential of each pixel area at the time of charging can be accurately detected.

In the above-described touch sensor function-equipped display device, it is preferable that the applying of the charge signal to the capacitance line for electrical charging is performed in a time period in which an image signal is not applied to the plurality of data lines.

In such a case, the rise rate of the electric potential of each pixel area at the time of charging can be accurately detected, thereby the touch position on the touch surface can be accurately detected.

In the above-described touch sensor function-equipped display device, it is preferable that the time period in which the image signal is not applied is a retrace period.

In such a case, the touch position on the touch surface can be detected without degrading the quality of a displayed image.

In the above-described touch sensor function-equipped display device, it is preferable that the touch sensor detects the rise rates of the electric potentials of all the pixel areas at the time of charging in a plurality of the retrace periods in a divisional manner.

In such a case, power-saving driving can be achieved without incurring a substantial decrease in the accuracy of detection of the touch position.

In the above-described touch sensor function-equipped display device, it is preferable that the touch sensor detects the rise rates of the electric potentials of all the pixel areas at the time of charging in one retrace period.

In such a case, the accuracy in the detection of the touch position is improved.

In the above-described touch sensor function-equipped display device, it is preferable that the touch sensor detects the rise rate of the electric potential of the pixel area at the time of charging at the ratio of one to several retrace periods.

In such a case, power-saving driving can be achieved without incurring a substantial decrease in the accuracy of detection of the touch position.

In the above-described touch sensor function-equipped display device, it is preferable that the display unit includes a liquid crystal layer.

In such a case, the image displaying function is excellent.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a touch sensor function-equipped display device according to a preferred embodiment of the invention will be described with reference to the accompanying drawings.

Figure 1:
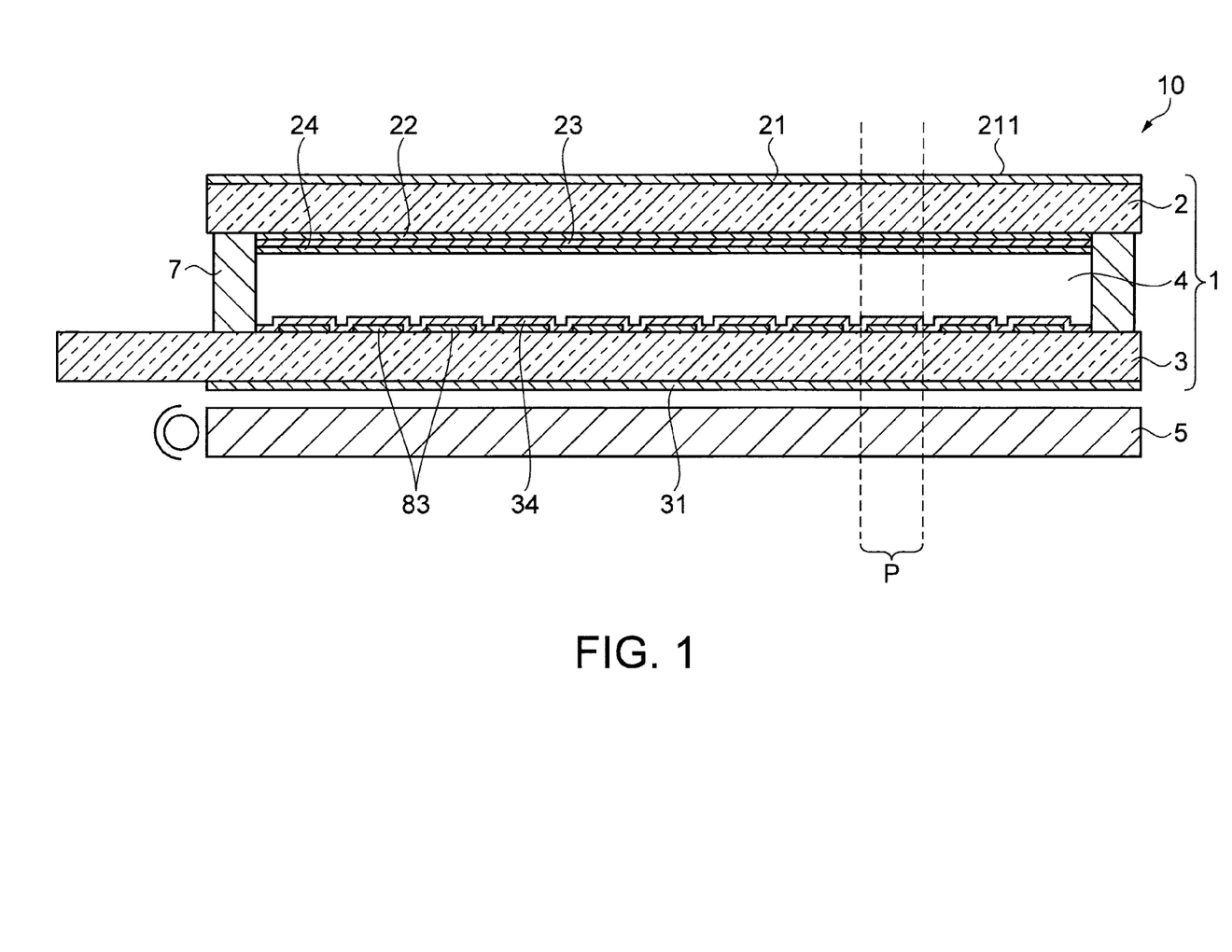
FIG. 1 is a cross-sectional view showing a touch sensor function-equipped display device according to a preferred embodiment of the invention.
Figure 2:
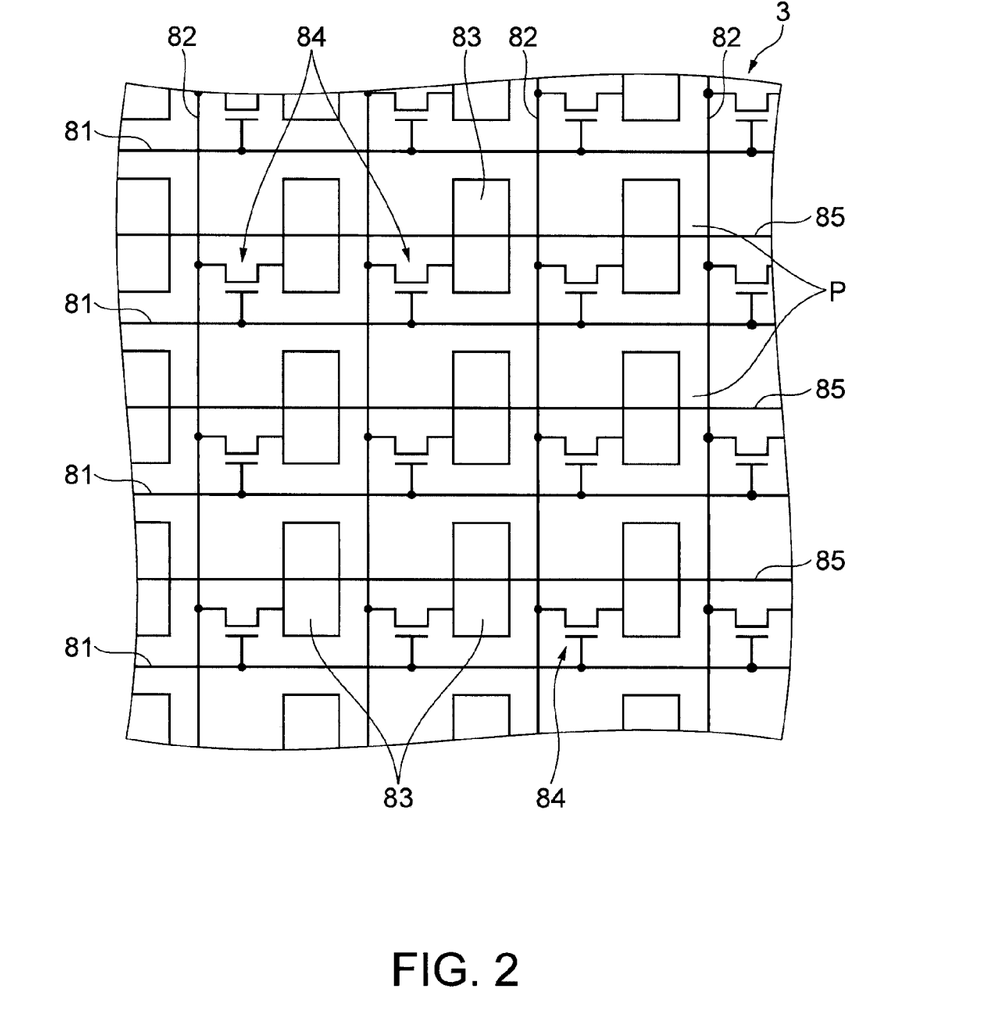
FIG. 2 is a plan view of a TFT array substrate included in the touch sensor function-equipped display device shown in FIG. 1.
Figure 3:
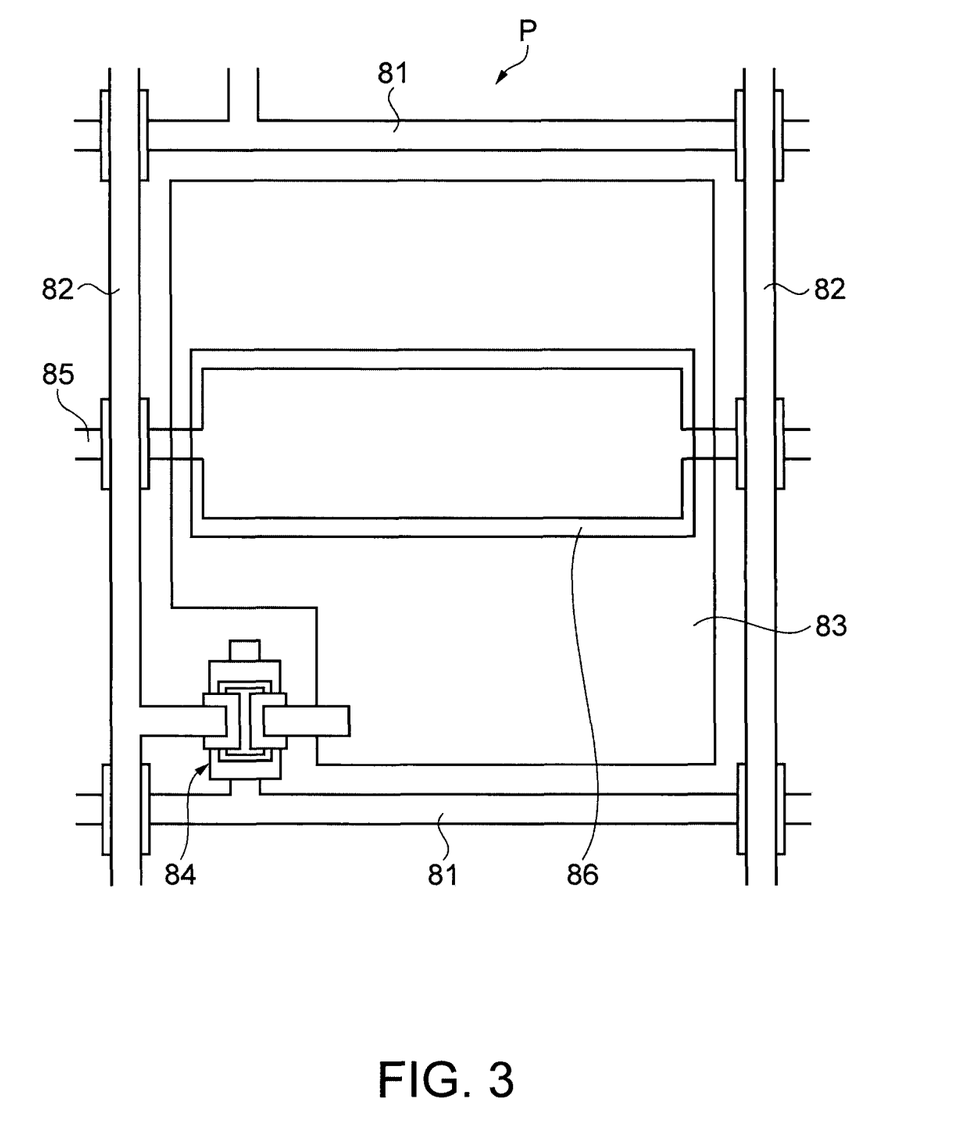
FIG. 3 is an enlarged plan view of a pixel area.
Figure 4:
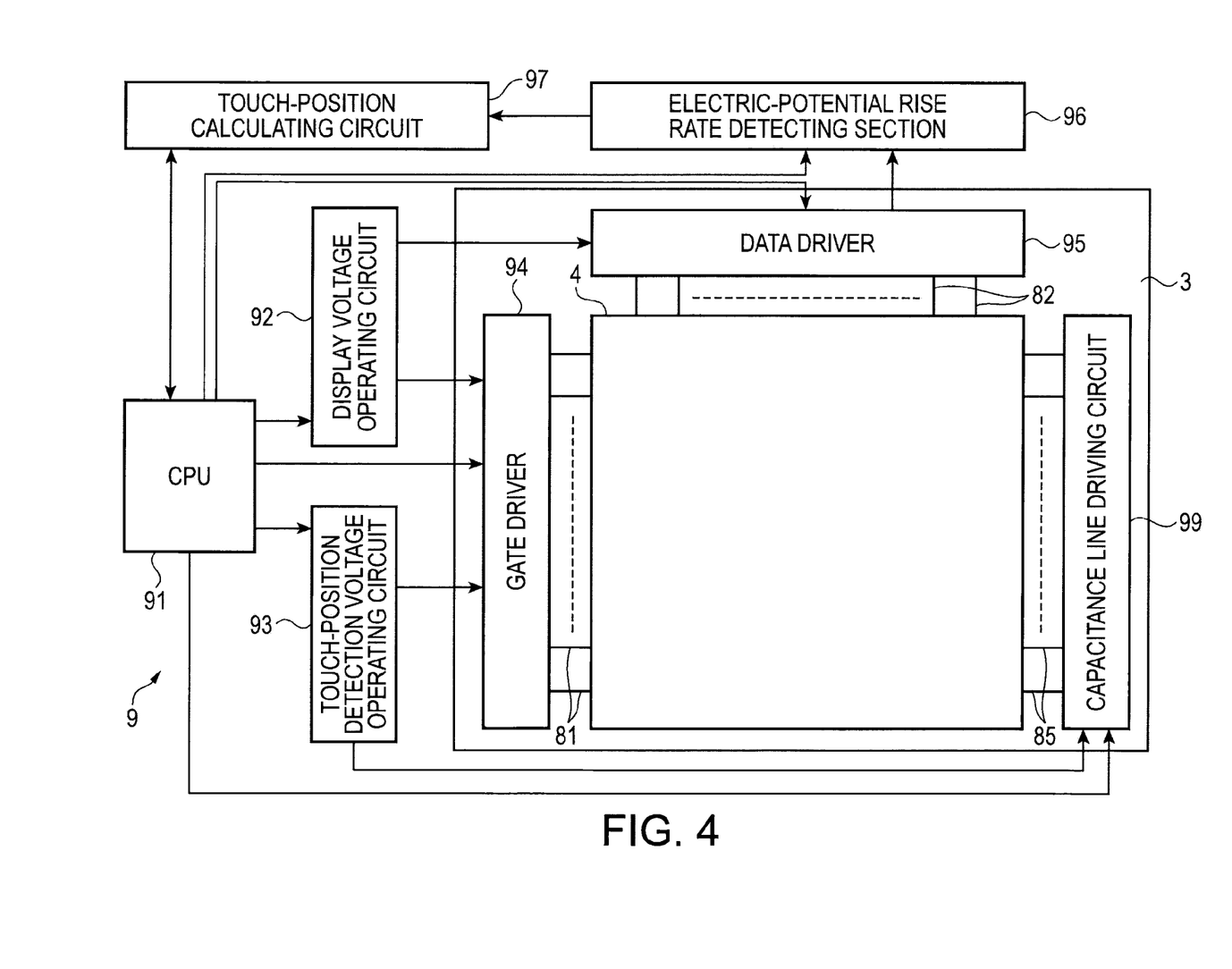
FIG. 4 is a block diagram of a control unit that is included in the touch sensor function-equipped display device shown in FIG. 1.
Figure 5:
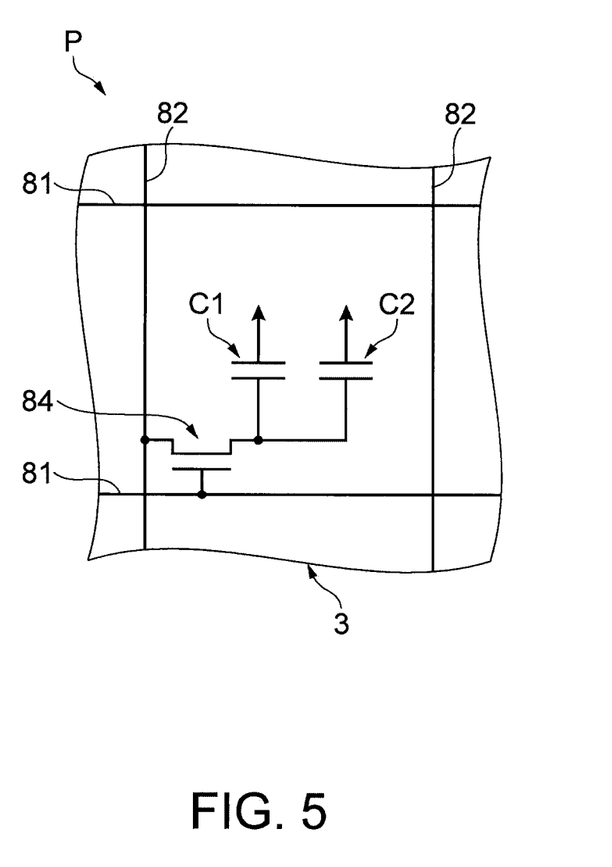
FIG. 5 is a diagram representing a pixel area as an equivalent circuit.
Figure 6:
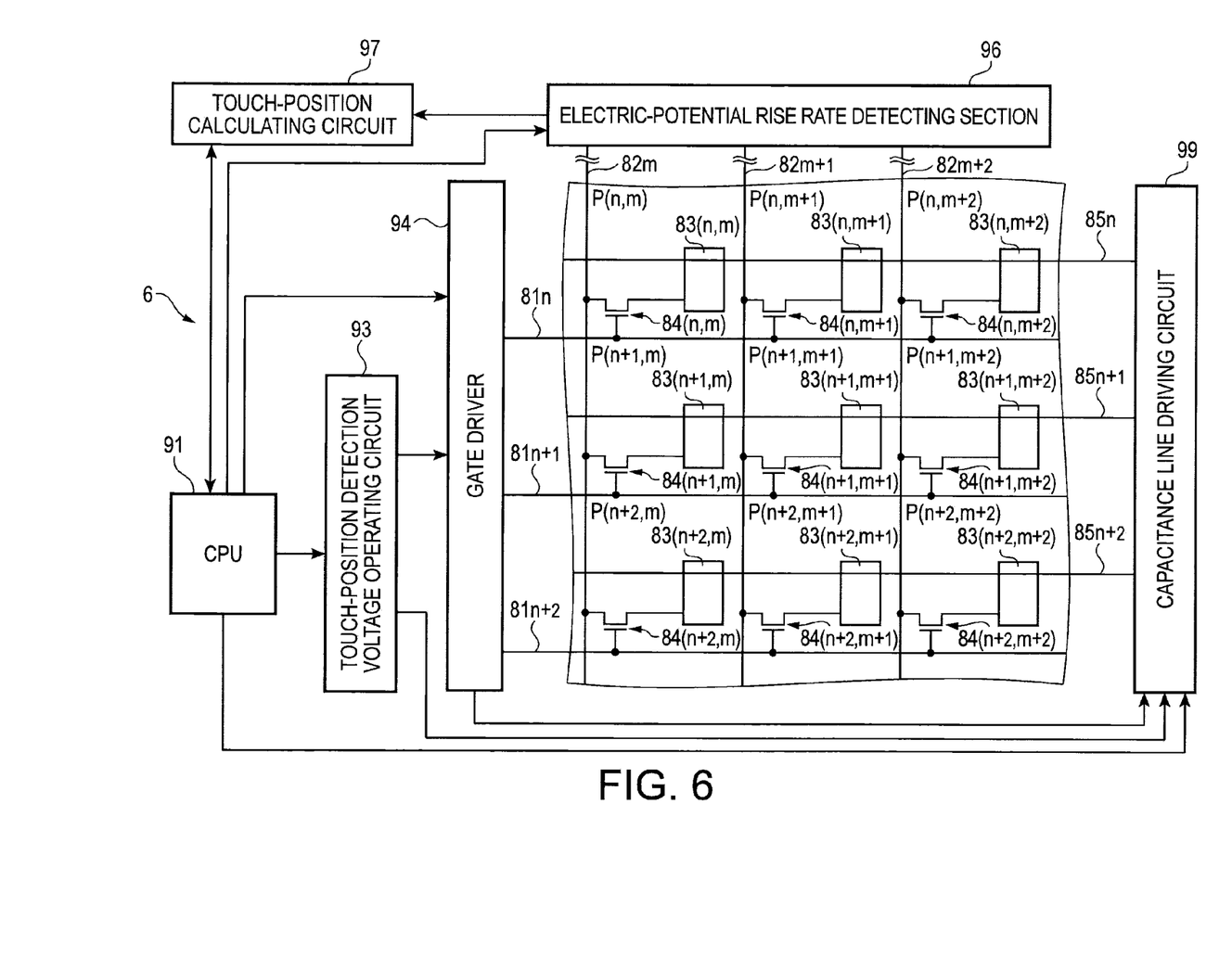
FIG. 6 is a block diagram of a touch sensor that is included in the touch sensor function-equipped display device shown in FIG. 1.

FIG. 1 is a cross-sectional view showing a touch sensor function-equipped display device according to a preferred embodiment of the invention. FIG. 2 is a plan view of a TFT array substrate included in the touch sensor function-equipped display device shown in FIG. 1. FIG. 3 is an enlarged plan view of a pixel area. FIG. 4 is a block diagram of a control unit 9 that is included in the touch sensor function-equipped display device shown in FIG. 1. FIG. 5 is a diagram representing a pixel area as an equivalent circuit. FIG. 6 is a block diagram of a touch sensor that is included in the touch sensor function-equipped display device shown in FIG. 1. Hereinafter, for convenience of description, in FIGS. 1 to 3, 5, and 6, the upper side is represented as an "upper side", the lower side is represented as a "lower side", the right side is represented as a "right side", and the left side is represented as a "left side".

A liquid crystal display device (touch sensor function-equipped display device) 10 shown in FIG. 1 has a liquid crystal panel 1 that includes an opposing substrate (first substrate) 2 and a TFT array substrate (second substrate) 3 facing each other and a liquid crystal layer (display unit) 4 that is formed between the opposing substrate 2 and the TFT array substrate 3 and a back light 5 disposed on the lower side of the liquid crystal panel 1. In addition, the liquid crystal display device 10, as shown in FIG. 4, includes a control unit 9, and a part of the control unit 9 configures a touch sensor 6. The touch sensor 6 can detect a touch position on the surface (touch surface 211) of the liquid crystal panel 1. In such a liquid crystal display device 10, for example, an image corresponding to a touch position that is detected by the touch sensor 6 can be displayed.

The back light 5 has a function for supplying light to the liquid crystal panel 1. The configuration of the back light 5 is not particularly limited. For example, the back light 5 can be configured by a quadrangular plate-shaped laminated body in which a reflection plate, a light guiding plate, a prism sheet (optical sheet), and a diffusion plate are sequentially stacked from the lower side (a side opposite to the liquid crystal panel 1) and a cold cathode fluorescent tube that is disposed on the side face of the light guiding plate. Here, an LED or the like may be used instead of the cold cathode fluorescent tube.

On the upper side of the back light 5, the liquid crystal panel 1 to which the light emitted from the back light 5 is projected is disposed. Each of the opposing substrate 2 and the TFT array substrate 3 that are included in the liquid crystal panel 1 is a colorless transparent glass substrate forming a quadrangular plate shape. The opposing substrate 2 and the TFT array substrate 3 are bonded together by a frame-shaped sealing member 7 that is disposed along the edge of the opposing substrate 2. By filling a liquid crystal material in a space formed by the opposing substrate 2, the TFT array substrate 3, and the sealing member 7, the liquid crystal layer 4 is formed. By using such a liquid crystal layer 4 as a display unit, the liquid crystal display device 10 can exhibit superior image display function.

To the lower face (a face located on the back light 5 side) of the TFT array substrate 3, an optical substrate 31 that is configured by a polarizing plate, a retardation plate, or the like is bonded. The optical substrate 31 has a function for converting the light emitted from the back light 5 into straight polarized light and outputting the polarized light to the liquid crystal layer 4.

On the other hand, on the upper face (a face located on the liquid crystal layer 4 side) of the TFT array substrate 3, as shown in FIG. 2, a plurality of gate lines 81, a plurality of data lines 82, a plurality of capacitance lines 85, a plurality of pixel electrodes 83, and a plurality of TFTs (thin film transistors) 84 are formed.

The plurality of gate lines 81 are formed at an equal pitch in the vertical direction (column direction) in FIG. 2, and each of the plurality of gate lines 81 extends in the horizontal direction (row direction) in FIG. 2. Each gate line 81 is electrically connected to a gate driver 94 that is formed on the edge (a portion protruding from the liquid crystal layer 4 to the left side in FIG. 4) of the TFT array substrate 3.

The plurality of capacitance lines 85 are formed at an equal pitch in the vertical direction (column direction) in FIG. 2, and each of the plurality of capacitance lines 85 extends in the horizontal direction (row direction) in FIG. 2 while being separated (insulated) from the gate lines 81. In addition, one capacitance line 85 is formed for one gate line 81 (in other words, the plurality of capacitance lines 85 are formed in correspondence with the plurality of gate lines 81 so as to form a one-to-one relationship therebetween). The plurality of capacitance lines 85 are electrically connected to a capacitance line driving circuit 99 that is formed on the edge (a portion protruding from the liquid crystal layer 4 to the right side in FIG. 4) of the TFT array substrate 3.

By forming the plurality of capacitance lines 85 as described above, as will be described, a touch position on the touch surface 211 can be detected by performing a control operation that is similar to that for displaying an image on the touch surface 211. Accordingly, the complexity of the control operation is suppressed, and the touch position on the touch surface 211 can be assuredly detected in a simple manner.

The plurality of data lines 82 are formed at an equal pitch in the horizontal direction (row direction) in FIG. 2, and each of the plurality of data lines 82 extends in the vertical direction (column direction) in FIG. 2. The data lines 82 are electrically connected to a data driver 95 that is formed on the edge (a portion protruding from the liquid crystal layer 4 to the upper side in FIG. 4) of the TFT array substrate 3.

In each of a plurality of pixel areas (pixels) P that are surrounded by a pair of adjacent gate lines 81 and 81 and a pair of adjacent data lines 82 and 82, a pixel electrode 83 and a TFT 84 are formed.

FIG. 3 is an enlarged diagram of one pixel area P. As shown in the figure, the TFT 84 is disposed near an intersection of the gate line 81 and the data line 82. The source electrode, the gate electrode, and the drain electrode of the TFT 84 are electrically connected to the gate line 81, the data line 82, and the pixel electrode 83. In addition, the pixel electrode 83 is formed in a broad area of the pixel area P other than an area in which the TFT 84 is formed. This pixel electrode 83 is formed from a transparent conductive film or the like and has optical transparency.

In addition, as shown in FIG. 3, on the lower side of the pixel area P, the capacitance line 85 is disposed. By opposing the capacitance line 85 and the pixel electrode 83 through an insulating film 86, storage capacitance is formed.

On the upper side of the pixel area P having the above-described configuration, as shown in FIG. 1, an alignment film 34 for which an alignment process has been performed is formed. The alignment film 34 is formed from alignment polymer such as alignment polyimide and sets the alignment of liquid crystal molecules near a corresponding pixel electrode 83 to be in a predetermined direction.

To the upper surface of the opposing substrate 2 opposing the TFT array substrate 3 through the liquid crystal layer 4, a polarizing plate 21 that outputs straight polarized light, which is perpendicular to the light output from the optical substrate 31, to the outer side (the upper side in FIG. 1) is bonded. The upper surface (a surface exposed to the outside of the device) of the polarizing plate 21 configures the touch surface 211 that is touched by an input tool such as a touch pen or an operator's finger.

On the lower surface of the opposing substrate 2, a color filter 22 is formed. In addition, on the lower side of the color filter 22, a common electrode 23 is formed. The common electrode 23, similarly to the pixel electrode 83, is formed from a transparent conductive film or the like and has optical transparency. Such a common electrode 23 is grounded (earthed). In addition, on the lower side of the common electrode 23, an alignment film 24 for which an alignment process has been performed is formed and sets the alignment of liquid crystal molecules near the common electrode 23 to be in a predetermined direction.

Next, the control unit 9 that controls the driving of the liquid crystal display device 10 will be described.

As shown in FIG. 4, the control unit 9 has a CPU 91, a display voltage operating circuit 92, a touch-position detection voltage operating circuit 93, a gate driver 94, a data driver 95, an electric-potential rise rate detecting section 96, a touch-position calculating circuit 97, and a capacitance line driving circuit 99. Of these components, a desired image is displayed in the liquid crystal display device 10 by the CPU 91, the display voltage operating circuit 92, the gate driver 94, the data driver 95, and the capacitance line driving circuit 99. In addition, a touch position on the touch surface 211 is detected by the CPU 91, the touch-position detection voltage operating circuit 93, the gate driver 94, the electric-potential rise rate detecting section 96, the touch-position calculating circuit 97, and the capacitance line driving circuit 99. In other words, the touch sensor 6 is configured by the CPU 91, the touch-position detection voltage operating circuit 93, the gate driver 94, the electric-potential rise rate detecting section 96, the touch-position calculating circuit 97, and the capacitance line driving circuit 99.

First, image display by using the control unit 9 will be described.

The CPU 91 forms a timing signal, a display data signal, a control signal, and the like that are needed for the display voltage operating circuit 92, the gate driver 94, and the data driver 95. The display voltage operating circuit 92 that has received the signal transmitted from the CPU 91 forms a plurality of voltage levels (voltage levels applied to each pixel electrode 83) that are needed for displaying a desired image in the liquid crystal display device 10.

The gate driver 94 sequentially applies voltages to the plurality of gate lines 81 at predetermined timings, one at each timing (for example, in the order from the gate line 81 located on the upper side in FIG. 2), based on the signal transmitted from the display voltage operating circuit 92, the timing signal transmitted from the CPU 91, or the like. Accordingly, the TFT 84 that is connected to the gate line 81 to which the voltage is applied is in the ON state.

The data driver 95 applies a voltage to each data line 82 in accordance with a timing at which a voltage is applied to the gate line 81 based on the display data signal (a voltage level applied to each pixel electrode 83) transmitted from the display voltage operating circuit 92, a timing signal transmitted from the CPU 91, or the like. The data driver 95 sequentially performs the above-described application of the voltage to all the gate lines 81, thereby applying voltages to all the pixel electrodes 83.

The capacitance line driving circuit 99 applies a voltage to each capacitance line 85 so as to fix the electric potential of the capacitance line 85 to a constant value, thereby accumulating electric charges in storage capacitance that is formed by interposing the insulating film 86 between the capacitance line 85 and the pixel electrode 83. This storage capacitance maintains the voltage (the display data signal) applied to the pixel electrode 83 through the TFT 84 for a predetermined period (one horizontal period).

When the voltage is applied to the pixel electrode 83, a liquid crystal of each pixel area P is driven in accordance with the voltage level. Then, even after having applied the voltage, the state is maintained for a predetermined period (one horizontal period). Accordingly, in each pixel area P, when light emitted from the back light 5 passes through the liquid crystal layer 4, the polarized state of light can be modulated. As a result, the desired image is displayed on the touch surface 211 by the light passing through the liquid crystal layer 4.

Next, detection of a touch position on the touch panel 211 that is performed by the control unit 9 (touch sensor 6) will be described.

The CPU 91 generates a timing signal, a charge signal, a control signal, and the like that are needed for the touch-position detection voltage operating circuit 93, the gate driver 94, the capacitance line driving circuit 99, the electric-potential rise rate detecting section 96, and the touch-position calculating circuit 97. The touch-position detection voltage operating circuit 93 that has received a signal from the CPU 91 forms a voltage level (the level of the voltage applied to each capacitance line 85) needed for charging each pixel area P. It is preferable that the levels of the voltages applied to each capacitance line 85 are the same.

The gate driver 94 sequentially applies voltages to the plurality of gate lines 81 at predetermined timings, one at each timing, based on the signal transmitted from the touch-position detection voltage operating circuit 93, a timing signal transmitted from the CPU 91, or the like. Hereinafter, the gate line 81 to which the voltage is applied is also referred to as a "gate line 81 on".

The capacitance line driving circuit 99 applies a voltage (charge signal) to the capacitance line 85 corresponding to the "gate line 81 on" (that is, the capacitance line located on the lower side of the pixel electrode 83 connected to the "gate line 81 on") based on the signal (a voltage signal applied to each capacitance line 85) transmitted from the touch-position detection voltage operating circuit 93, a timing signal transmitted from the CPU 91, a driving timing signal of the gate driver 94, or the like. Accordingly, electric charges are accumulated in each capacitance formed between each pixel electrode 83 connected to the "gate line 81 on" and the capacitance line 85 corresponding thereto, and charging of the pixel area P corresponding thereto is started.

The capacitance line driving circuit 99 sequentially applies the voltages (charge signals), as described above, to all the capacitance lines 85, thereby charging all the pixel areas P. According to such a charging method, all the pixel areas P can be sufficiently charged in an easy manner. In addition, the charging method is similar to the driving method for displaying an image. Accordingly, the control operation can be simplified.

When each pixel area P corresponding to the "gate line 81 on" is charged, each TFT 84 connected to the "gate line 81 on" is in the ON state. Accordingly, the pixel electrode included in each pixel area P and the data line 82 corresponding thereto are electrically connected to each other. Accordingly, the electric-potential rise rate detecting section 96 detects the rise rate of the electric potential of each pixel area P corresponding to the "gate line 81 on" at the time of charging through each data line 82 and transmits the result of detection to the touch-position calculating circuit 97. As described above, the electric-potential rise rate detecting section 96 detects the rise rate of the electric potential of the pixel area P corresponding to each data line 82 at the time of charging through the data line 82. In other words, the data line 82 is used as both an image signal wiring and a wiring for detecting the rise rate of the electric potential. Accordingly, the configuration of the device can be simplified. In addition, the number of wirings disposed on the TFT array substrate 3 can be decreased (in other words, a wiring for detecting the rise rate of the electric potential does not need to be formed in addition to the data line 82), and accordingly, the aperture ratio of the TFT array substrate 3 can be increased.

Here, FIG. 5 is an equivalent circuit of one pixel area P. In FIG. 5, "C1" is pixel capacitance that is formed by interposing the liquid crystal layer 4 between the pixel electrode 83 and the common electrode 23, and "C2" is capacitance that is formed by interposing the insulating film 86 between the capacitance line 85 and the pixel electrode 83. In the pixel area P corresponding to the touch position on the touch surface 211, the gap between the common electrode 23 and the pixel electrode 83 decreases by pressing the touch surface 211 by using a finger, an input tool, or the like, compared to a state in which the gap between the common electrode 23 and the pixel electrode 83 is not pressed, thereby the pixel capacitance C1 is changed (increased) or stray capacitance (not shown) is generated by bringing a finger into contact with the touch surface 211. Accordingly, the capacitance of the entire pixel area P changes, and the rise rate of the electric potential of the pixel area P at the time of charging changes (decreases). In other words, the rise rate of the electric potential of the pixel area P corresponding to the touch position on the touch surface 211 at the time of charging is different from those other pixel areas P at the time of charging.

The touch-position calculating circuit 97 detects the position (the position on the touch surface 211 on the plan view), which has the rise rate of the electric potential out of a predetermined range T, on the pixel area P as a touch position by using the above-described characteristic (the change in the rise rate of the electric potential). In addition, for example, the rise rate of the electric potential of a pixel area P, which is not touched, at the time of charging is used as a reference, and a range having a predetermined width extending to both sides (the higher side and the lower side) of the reference may be used as the above-described "predetermined range T".

Hereinafter, a detailed description will be followed based on FIG. 6. In FIG. 6, for convenience of description, the data driver 95 is not shown. Hereinafter, a plurality of gate lines 81 are referred to as "gate line 81$n$", "gate line 81$n$+1", and "gate line 81$n$+2" in the order from the upper side in FIG. 6, a plurality of capacitance lines 85 will be referred to as "capacitance line 85$n$", "capacitance line 85$n$+1", and "capacitance line 85$n$+2" in the order from the upper side in FIG. 6, and a plurality of data lines 82 will be referred to as "data line 82$m$", "data line 82$m$+1", and "data line 82$m$+2" in the order from the left side in FIG. 6. In addition, hereinafter, a pixel area P, a pixel electrode 83, and a TFT 84 corresponding to the gate line 81$n$ and the data line 82$m$ are referred to as "pixel area P(n, m)", "pixel electrode 83$(n, m)$", and "TFT 84$(n, m)$". This also applies to another pixel area P, another pixel electrode 83, and another TFT 84. Here, a case where a position corresponding to the pixel area P(n+2, m+1) of the touch surface 211 is touched will be described. In other words, only the rise rate of the electric potential of the pixel area P(n+2, m+1) at the time of charging is out of the predetermined range T set in the touch-position calculating circuit 97.

1. Gate Line 81$n$

First, a voltage is applied to the gate line 81$n$ by the gate driver 94, and accordingly, TFT 84$(n, m)$, TFT 84$(n, m$+1), and TFT 84$(n, m$+2) that are connected to the gate line 81$n$ are in the ON state. At this time, TFTs 84$(n$+1, $m)$ to 84$(n$+1, $m$+2) that are connected to the gate line 81$n$+1 and TFTs 84$(n$+2, $m)$ to 84$(n$+2, $m$+2) that are connected to the gate line 81$n$+2 are in the OFF state.

Next, in accordance with the applying of the voltage to the gate line 81$n$ (that is, at a time when a voltage is applied to the gate line 81$n$), a voltage (charge signal) of a predetermined level is applied to the capacitance line 85$n$ by the capacitance line driving circuit 99.

When the above-described voltage (charge signal) is applied to the capacitance line 85$n$, charging of the pixel areas P(n, m) to P(n, m+2) corresponding to the capacitance line 85$n$ is started. At this time, as described above, the TFTs 84$(n, m)$ to 84$(n, m$+2) are in the ON state, and accordingly, the electric-potential rise rate detecting section 96 detects the rise rates of the electric potentials of the pixel areas P(n, m) to P(n, m+2) at the time of charging through the data lines 82$m$ to 82$m$+2. Then, the electric-potential rise rate detecting section 96 transmits the result of the detection to the touch-position calculating circuit 97.

The touch-position calculating circuit 97 compares the received rise rates of the electric potentials of the pixel areas P(n, m) to P(n, m+2) with the set predetermined range T. The positions corresponding to the pixel areas P(n, m) to P(n, m+2) of the touch surface 211 are not touched. Accordingly, the rise rates of the electric potentials of the pixel areas P(n, m) to P(n, m+2) are within the predetermined range T.

By receiving the result of the comparison, the touch-position calculating circuit 97 determines that the positions corresponding to the pixel areas P(n, m) to P(n, m+2) of the touch surface 211 are not touched.

2. Gate Line 81n+1

First, a voltage is applied to the gate line 81n+1 by the gate driver 94, and accordingly, TFT 84(n+1, m), TFT 84(n+1, m+1), and TFT 84(n+1, m+2) that are connected to the gate line 81n+1 are in the ON state.

Next, in accordance with the applying of the voltage to the gate line 81n+1, a voltage (charge signal) of a predetermined level is applied to the capacitance line 85n+1 by the capacitance line driving circuit 99. It is preferable that this voltage level is the same as that of the voltage applied to the capacitance line 85n in the above item 1.

When the above-described voltage (charge signal) is applied to the capacitance line 85n+1, charging of the pixel areas P(n+1, m) to P(n+1, m+2) corresponding to the capacitance line 85n+1 is started. At this time, as described above, the TFTs 84(n+1, m) to 84(n+1, m+2) are in the ON state, and accordingly, the electric-potential rise rate detecting section 96 detects the rise rates of the electric potentials of the pixel areas P(n+1, m) to P(n+1, m+2) at the time of charging through the data lines 82m to 82m+2. Then, the electric-potential rise rate detecting section 96 transmits the result of the detection to the touch-position calculating circuit 97.

The touch-position calculating circuit 97 compares the received rise rates of the electric potentials of the pixel areas P(n+1, m) to P(n+1, m+2) with the set predetermined range T, respectively. The positions corresponding to the pixel areas P(n+1, m) to P(n+1, m+2) of the touch surface 211 are not touched. Accordingly, the rise rates of the electric potentials of the pixel areas P(n+1, m) to P(n+1, m+2) are within the predetermined range T. By receiving the result of the comparison, the touch-position calculating circuit 97 determines that the positions corresponding to the pixel areas P(n+1, m) to P(n+1, m+2) of the touch surface 211 are not touched.

3. Gate Line 81n+2

Next, a voltage is applied to the gate line 81n+2 by the gate driver 94, and accordingly, TFT 84(n+2, m), TFT 84(n+2, m+1), and TFT 84(n+2, m+2) that are connected to the gate line 81n+2 are in the ON state.

Next, in accordance with the applying of the voltage to the gate line 81n+2, a voltage (charge signal) of a predetermined level is applied to the capacitance line 85n+2 by the capacitance line driving circuit 99. It is preferable that this voltage level is the same as that of the voltage applied to the capacitance line 85n in the above item 1.

When the above-described voltage (charge signal) is applied to the capacitance line 85n+2, charging of the pixel areas P(n+2, m) to P(n+2, m+2) corresponding to the capacitance line 85n+2 is started. At this time, as described above, the TFTs 84(n+2, m) to 84(n+2, m+2) are in the ON state, and accordingly, the electric-potential rise rate detecting section 96 detects the rise rates of the electric potentials of the pixel areas P(n+2, m) to P(n+2, m+2) at the time of charging through the data lines 82m to 82m+2. Then, the electric-potential rise rate detecting section 96 transmits the result of the detection to the touch-position calculating circuit 97.

The touch-position calculating circuit 97 compares the received rise rates of the electric potentials of the pixel areas P(n+2, m) to P(n+2, m+2) with the set predetermined range T, respectively. The positions corresponding to the pixel areas P(n+2, m) to P(n+2, m+2) of the touch surface 211 are not touched. Accordingly, the rise rates of the electric potentials of the pixel areas P(n+2, m) to P(n+2, m+2) are within the predetermined range T. By receiving the result of the comparison, the touch-position calculating circuit 97 determines that the positions corresponding to the pixel areas P(n+2, m) to P(n+2, m+2) of the touch surface 211 are not touched.

On the other hand, the position corresponding to the pixel area P(n+2, m+1) of the touch surface 211 is touched. Accordingly, the rise rate of the electric potential of the pixel area P(n+2, m+1) at the time of charging is out of the predetermined range T. By receiving the result of the comparison, the touch-position calculating circuit 97 determines that the position corresponding to the pixel area P(n+2, m+1) of the touch surface 211 is touched (that is, a touch position).

As described above, the touch-position calculating circuit 97 determines whether a touch surface 211 corresponding to each pixel area P is touched by comparing the rise rates of the electric potentials of all the pixel areas P at the time of charging with the predetermined range T, thereby detecting the touch position on the touch surface 211. Then, the touch-position calculating circuit 97 transmits the result (touch position information) of the detection to the CPU 91.

The CPU 91 that has received the touch position information forms a display data signal corresponding to the position information and transmits the formed display data signal to needed portions of the display voltage operating circuit 92, the gate driver 94, and the data driver 95, together with the timing signal, the control signal, or the like. Accordingly, an image corresponding to the touch position is displayed on the touch surface 211.

As given above, the method of detecting the touch position on the touch sensor 6 has been described in detail.

According to such a touch sensor 6, for example, even in a case where two or more positions are simultaneously touched on the touch surface 211, all the touched positions can be detected. In other words, the touch sensor 6 can respond to a multiple-touch operation. Accordingly, the convenience of a liquid crystal display device 10 including the touch sensor 6 is improved.

The detecting of the touch position by using the touch sensor 6 is preferably performed in a period in which a voltage (display data signal) for displaying an image is not applied to the data line 82. In such a case, the rise rate of the electric potential of each pixel area at the time of charging can be precisely detected. Accordingly, a touch position on the touch surface 211 can be precisely detected.

In particular, the detection of the touch position by using the touch sensor 6 is more preferably performed in a retrace period during the above-described period. In such a case, the touch position on the touch surface 211 can be detected without degrading the quality of an image that is displayed on the touch surface 211. Here, the "retrace period" represents a period from when display of a predetermined image (frame) is completed to when display of a next image (frame) is started. In other words, in a case where voltages are sequentially applied from the gate line 81n located on the upper side in FIG. 6 to the lower side thereof, the "retrace period" represents a period from when application of a voltage to the gate line 81n+2 is completed to when the application of a voltage to the gate line 81n is started.

In addition, the touch sensor 6 may detect the touch position on the touch surface 211 in all the retrace periods. Alternatively, the touch sensor 6 may detect the touch position on the touch surface 211 at the ratio (period) of one to several times (for example, once for 60 times).

In a case where the detection of the touch position on the touch surface 211 is performed in all the retrace periods, a touch position can be detected even for high-speed touch (touch of which the time of contact with the touch surface 211 is short), the touch position can be detected. Accordingly, there is an advantage that the detection accuracy for the touch position is improved.

On the other hand, in a case where the detection of the touch position on the touch surface 211 is performed at the ratio of one to several retrace periods, there is an advantage in that power-saving driving of the liquid crystal display device 10 can be performed. In addition, in a typical liquid crystal display device, an image displayed on the touch surface 211 includes 60 frames per second. Thus, 60 retrace periods exist per second. However, the time period during which the touch surface 211 is touched in a case where the touch surface 211 is touched is longer than the retrace period (for example, 1/60 second). Accordingly, even in a case where the detection of the touch position is performed at the ratio of one to several retrace periods, the accuracy of detection of the touch position is not substantially decreased.

In addition, the detection of the touch position for the entire touch surface 211 may be performed for one retrace period. Alternatively, the detection of the touch position for the entire touch surface 211 may be performed in a divisional manner for several retrace periods. In other words, existence of touch for all the pixel areas P may be determined in one retrace period or may be determined in several retrace periods in a divisional manner (for example, in FIG. 6, existence of touch is determined for the pixel areas P(n, m) to P(n, m+2) for the first retrace period, existence of touch is determined for the pixel areas P(n+1, m) to P(n+1, m+2) for the second retrace period, and existence of touch for the pixel areas P(n+2, m) to P(n+2, m+2) is determined for the third retrace period).

In a case where the detection of the touch position for the entire touch surface 211 is performed in one retrace period, the touch position can be detected for high-speed touch (touch having a short time of contact with the touch surface 211). Accordingly, there is an advantage in that the accuracy of the detection of the touch position is improved.

On the other hand, in a case where the detection of the touch position for the entire touch surface 211 is performed in several retrace periods in a divisional manner, power-saving driving of the liquid crystal display device 10 can be achieved. In addition, as described above, even in the case where the detection of the touch position for the entire touch surface 211 is performed in several retrace periods in a divisional manner, the accuracy of the detection of the touch position is not substantially decreased.

According to the liquid crystal display device 10 having the above-described configuration, by utilizing the built-in touch sensor 6 located inside the device, an additional touch sensor does not need to be disposed on the upper side (display surface side) of the device. Accordingly, the liquid crystal display device 10 can provide an excellent image, and miniaturization of the device can be achieved.

As above, the touch sensor function-equipped display device according to an embodiment of the invention has been described with reference the accompanying drawings. However, the invention is not limited thereto. Thus, the configuration of each unit can be replaced by an arbitrary configuration having the same function. In addition, an arbitrary constituent member or process may be added thereto.

In addition, in the above-described embodiment, the touch sensor function-equipped display device in which the back light is disposed on the TFT array substrate (second substrate) side, and a touch surface is provided on the opposing substrate (first substrate) has been described. However, the invention is not limited thereto. Thus, a configuration in which the back light is disposed on the opposing substrate side, and the touch surface is provided on the TFT array substrate (second substrate) side may be used.

In addition, in the above-described embodiment, a configuration in which a liquid crystal layer is included as the display unit has been described. However, the invention is not limited thereto. Thus, for example, an electrophoretic display layer in which a plurality of microcapsules having an electrophoretic dispersion solution, which is formed by dispersing (suspending) electrophoretic particles in a liquid dispersion medium, filled therein, is fixed by a binder may be used as the display unit.

In addition, in the above-described embodiment, a configuration in which the capacitance lines are formed to be parallel to the gate lines has been described. However, the invention is not limited thereto. Thus, for example, the capacitance lines may be formed to be parallel to the data lines. In such a case, by performing so-called point-sequential scanning, a touch position on the touch surface can be detected.

The entire disclosure of Japanese Patent Application No. 2009-057203, filed Mar. 10, 2009 is expressly incorporated by reference herein.

What is claimed is:

1. A touch sensor function-equipped display device comprising:
   a first substrate that has a common electrode;
   a second substrate that is disposed to face the first substrate;
   a display unit that is disposed between the first substrate and the second substrate; and
   a touch sensor that detects a touch position on a touch surface disposed on the first substrate side or the second substrate side,
   wherein the second substrate includes:
   a plurality of data lines that are aligned in a row direction;
   a plurality of gate lines that are aligned in a column direction approximately perpendicular to the data lines;
   a plurality of pixel electrodes that are disposed in each pixel area that is surrounded by a pair of adjacent data lines and a pair of adjacent gate lines;
   a plurality of capacitance lines that form capacitance with each of the pixel electrodes therebetween; and
   a plurality of thin film transistors that are disposed for each of the plurality of pixel electrodes and are electrically connected to the pixel electrodes, the data lines, and the gate lines, and
   wherein the touch sensor includes an electric-potential rise rate detecting unit that detects a rise rate of an electric potential of each pixel area at the time of charging by applying a charge signal to the capacitance line and detects a position of the pixel area in which the rise rate of the electric potential detected by the electric-potential rise rate detecting unit is out of a predetermined range as the touch position, and
   wherein the touch sensor detects the rise rates of the electric potentials of all the pixel areas at the time of charging in a plurality of retrace periods in a divisional manner.

2. The touch sensor function-equipped display device according to claim 1, wherein the plurality of capacitance lines are aligned in the column direction in correspondence with the plurality of scanning lines.

3. The touch sensor function-equipped display device according to claim 1, wherein the electric-potential rise rate detecting unit detects the rise rate of the electric potential of each pixel area through the plurality of data lines.

4. The touch sensor function-equipped display device according to claim 1, wherein the touch sensor charges each pixel area by sequentially applying voltages to the plurality of gate lines and applying a charge signal to the capacitance line corresponding to the gate line to which the voltage is applied and detects the rise rate of the electric potential of the each pixel area at that time by using the electric-potential rise rate detecting unit.

5. The touch sensor function-equipped display device according to claim 1, wherein the applying of the charge signal to the capacitance line for electrical charging is performed in a time period in which an image signal is not applied to the plurality of data lines.

6. The touch sensor function-equipped display device according to claim 5, wherein the time period in which the image signal is not applied is a retrace period.

7. A touch sensor function-equipped display device comprising:
 a first substrate that has a common electrode;
 a second substrate that is disposed to face the first substrate;
 a display unit that disposed between the first substrate and the second substrate; and
 a touch sensor that detects a touch position on a touch surface disposed on the first substrate side or the second substrate side,
 wherein the second substrate includes:
 a plurality of data lines that are aligned in a row direction;
 a plurality of gate lines that are aligned in a column direction approximately perpendicular to the data lines;
 a plurality of pixel electrodes that are disposed in each pixel area that is surrounded by a pair of adjacent data lines and a pair of adjacent gate lines;
 a plurality of capacitance lines that form capacitance with each of the pixel electrodes therebetween; and
 a plurality of thin film transistors that are disposed for each of the plurality of pixel electrodes and are electrically connected to the pixel electrodes, the data lines, and the gate lines, and
 wherein the touch sensor includes an electric-potential rise rate detecting unit that detects a rise rate of an electric potential of each pixel area at the time of charging by applying a charge signal to the capacitance line and detects a position of the pixel area in which the rise rate of the electric potential detected by the electric-potential rise rate detecting unit is out of a predetermined range as the touch position, and
 wherein the touch sensor detects the rise rate of the electric potential of the pixel area at the time of charging at the ratio of one to several retrace periods.

8. The touch sensor function-equipped display device according to claim 1, wherein the display unit includes a liquid crystal layer.

9. The touch sensor function-equipped display device according to claim 7, wherein the plurality of capacitance lines are aligned in the column direction in correspondence with the plurality of scanning lines.

10. The touch sensor function-equipped display device according to claim 7, wherein the electric-potential rise rate detecting unit detects the rise rate of the electric potential of each pixel area through the plurality of data lines.

11. The touch sensor function-equipped display device according to claim 7, wherein the touch sensor charges each pixel area by sequentially applying voltages to the plurality of gate lines and applying a charge signal to the capacitance line corresponding to the gate line to which the voltage is applied and detects the rise rate of the electric potential of the each pixel area at that time by using the electric-potential rise rate detecting unit.

12. The touch sensor function-equipped display device according to claim 7, wherein the applying of the charge signal to the capacitance line for electrical charging is performed in a time period in which an image signal is not applied to the plurality of data lines.

13. The touch sensor function-equipped display device according to claim 12, wherein the time period in which the image signal is not applied is a retrace period.

14. The touch sensor function-equipped display device according to claim 7, wherein the display unit includes a liquid crystal layer.

* * * * *